(12) United States Patent
Sato et al.

(10) Patent No.: US 6,768,054 B2
(45) Date of Patent: Jul. 27, 2004

(54) WATERPROOF STRUCTURE OF ELECTRONIC PARTS-CONTAINING BOX

(75) Inventors: Hidetoshi Sato, Susono (JP); Ryuji Kawai, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/301,778

(22) Filed: Nov. 22, 2002

(65) Prior Publication Data

US 2003/0102143 A1 Jun. 5, 2003

(30) Foreign Application Priority Data

Nov. 30, 2001 (JP) .................................... P2001-366770
Apr. 5, 2002 (JP) .................................... P2002-103907

(51) Int. Cl.⁷ ................................................ H02G 3/08
(52) U.S. Cl. ........................... 174/50; 174/53; 174/58; 174/60; 220/4.02
(58) Field of Search ............................ 174/50, 53, 58, 174/60; 220/3.6, 3.8, 4.02; 248/906; 439/535

(56) References Cited

U.S. PATENT DOCUMENTS

| 5,608,611 A | * | 3/1997 | Szudarek et al. ........... 361/753 |
| 5,837,933 A | * | 11/1998 | Fligelman ..................... 174/50 |
| 5,962,811 A | * | 10/1999 | Rodrigues et al. ............. 174/76 |
| 6,069,315 A | * | 5/2000 | Tang ............................ 174/50 |
| 6,555,748 B1 | * | 4/2003 | Gul ............................. 174/59 |

FOREIGN PATENT DOCUMENTS

JP    4-38468 B    9/1992

* cited by examiner

Primary Examiner—Dhiru R Patel
(74) Attorney, Agent, or Firm—Sughrue Mion, PLLC (57) ABSTRACT

A waterproof structure of an electric parts-containing box includes a containing box body and a front cover which is mounted on the containing box body so as to cover a opening portion thereof. Either the containing box body or the front cover has a through hole. A water intrusion suppressing portion is formed on a face of either the containing box body or the front cover so as to suppress an intrusion of water which flows on the face into the through hole.

6 Claims, 10 Drawing Sheets

WATERPROOF STRUCTURE OF ELECTRONIC PARTS-CONTAINING BOX

BACKGROUND OF THE INVENTION

This invention relates to a waterproof structure of an electronic parts-containing box such as a connector block mounted in a panel hole in a vehicle body panel of a vehicle or the like.

Many wire harnesses are installed, for example, on a vehicle body of a vehicle, and among these wire harnesses, there are some each passing through a panel hole in a vehicle body panel separating the inside and outside of a car room from each other. Thus, the wire harness is passed through the panel hole, and this wire harness is installed at the inside and outside of the car room, and therefore has a large overall length, and can not be easily handled, and besides there is a possibility that the wire harness is passed through the panel hole in the wrong direction. Therefore, it has been proposed to connect an inside wire harness at the inside of the car room to an outside wire harness at the outside of the car room by the use of connectors (JP-B-4-38468U).

Figure 11:
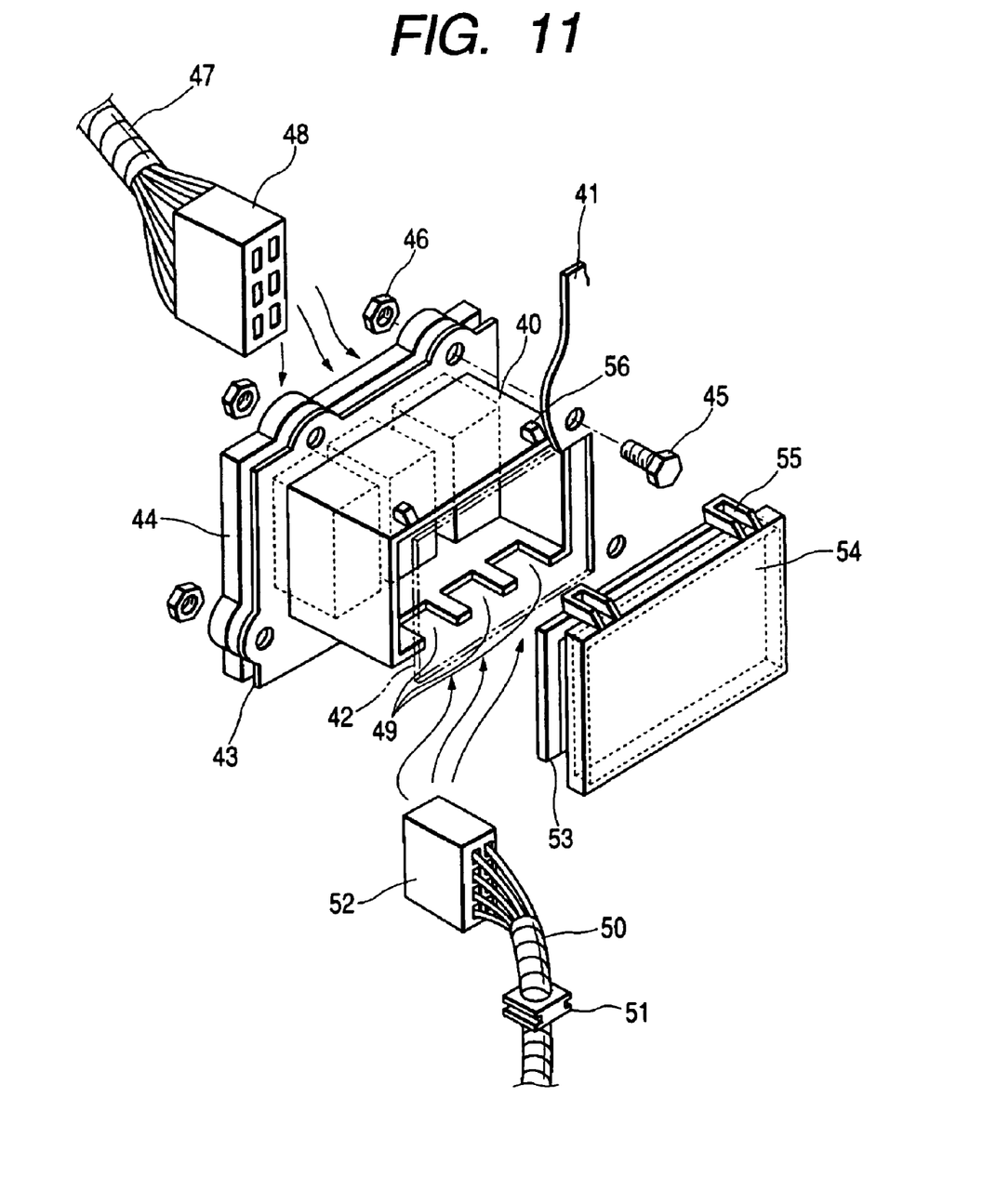
FIG. 11 is an exploded, perspective view showing a related connector block.

More specifically, as shown in FIG. 11, a connector block 40 is passed through a panel hole 42 in a panel 41 from the outside of a car room, and a flange 44 is abutted against a face of the panel 41 through a packing 43, and the flange 44 is fixedly secured to the face of the panel 41 by bolts 45 and nuts 46. A connector 48, connected to an inside wire harness 47 (installed at the inside of the room), is attached to the connector block 40 at the inside of the room, and a grommet 51 on an outside wire harness 50 (installed at the outside of the room) is mounted in a grommet mounting portion 49, and a connector 52, connected to the outside wire harness 50, is fitted relative to the inside connector 48 to be electrically connected thereto. Then, retaining holes 55, formed in a cover 54 having a packing 53 affixed to an inner side thereof, are engaged respectively with retaining projections 56 on the connector block 40, thereby attaching the cover 54 to the connector block 40, and in this manner the two wire harnesses 47 and 50 can be electrically connected together in the interior of the connector block 40 sealed in a waterproof manner.

Thus, for attaching the cover 54 to the connector block 40, the retaining holes 55 in the cover 54 are engaged respectively with the retaining projections 56 on the connector block 40, and the packing 53 is compressed to form a seal between the cover 54 and the connector block 40, thereby ensuring the waterproof effect. In some cases, however, the rate of compression of the packing 53 is low with the engagement (resin locking) between the retaining holes 55 and the retaining projections 56, and in such a case there is a possibility that water intrudes through a gap between the cover 54 and the connector block 40.

Figure 12:
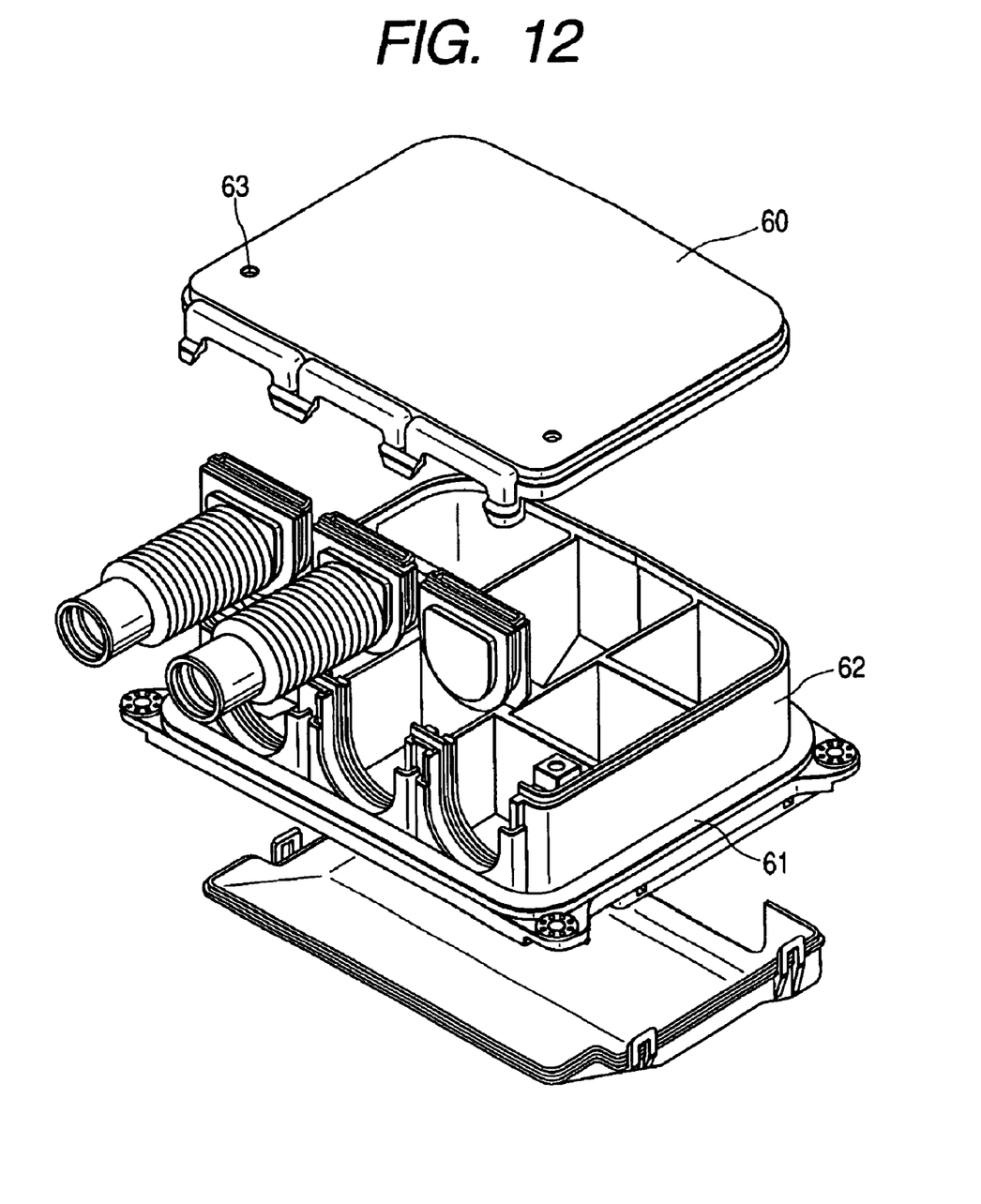
FIG. 12 is an exploded, perspective view of a related electronic parts-containing box.

Therefore, as shown in FIG. 12, there has been proposed a construction in which a cover 60 and a connector block body 62 are fastened together by screw members (not shown), thereby sufficiently compressing a packing 61, interposed between the cover 60 and the connector block body 61, so as to enhance a waterproof performance.

Although a waterproof seal between the cover 60 and the connector block body 62 is enhanced by the packing 61 sufficiently compressed upon fastening by the screw members, through holes 63 for the insertion (or passage) of the screw members therethrough must be formed in the cover 60, and therefore there is a possibility that water intrudes into the interior of the connector block body 62 through a gap in each through hole 63.

SUMMARY OF THE INVENTION

It is therefore an object of the present invention to provide a waterproof structure of an electronic parts-containing box which suppresses the intrusion of water through a gap in a through hole.

In order to achieve the above object, according to the present invention, there is provided a waterproof structure of an electronic parts-containing box comprising:
- a containing box body; and
- a front cover, mounted on the containing box body so as to cover a opening portion thereof;
- wherein either the containing box body or the front cover has a through hole; and
- wherein a water intrusion suppressing portion is formed on a face of either the containing box body or the front cover so as to suppress an intrusion of water which flows on the face into the through hole.

In this configuration, the intrusion of the water into the through hole is suppressed by the water intrusion-suppressing portion, and therefore the water is prevented from intruding into the containing box body through a gap in the through hole.

Preferably, the water intrusion suppressing portion is a guide wall which is formed on the face of either the containing box body or the front cover, and is disposed near to the through hole, so as to guide the water in a direction which is different from a direction in which the water flows toward the through hole.

Here, it is preferable that the guide wall is a peripheral wall which surrounds at least a part of a circumference of the through hole.

Here, it is preferable that the guide wall is a peripheral wall in which a lower part of the peripheral wall is open in a direction of gravity when the face of either the containing box body or the front cover is inclined.

In this configurations, the water intrusion-suppressing portion is thus formed by the guide wall, and therefore the water, flowing in the direction toward the through hole, is guided in the different direction by the guide wall, and therefore the intrusion of the water into the containing box body through the gap in the through hole is suppressed with this simple construction.

Preferably, the waterproof structure comprising a fastening member, which threads through the through hole to fasten the front cover and the containing box body. The water intrusion suppressing portion is a rib which formed around at least a part of a circumference of the through hole. The rib is crushed by an abutment face of the fastening member so as to seal a gap between the face and the abutment face of the fastening member when the containing box body and the front cover are fastened together by the fastening member.

In this configuration, the water intrusion-suppressing portion is formed by the rib, and therefore when the containing box body and the front cover are fastened together by the fastening member, the rib is crushed to seal the gap between the face of the one member (having the through hole) of either the containing box body or the front cover and the abutment face of the fastening member, and therefore the intrusion of the water into the containing box body through the gap in the through hole is suppressed with this simple construction.

Preferably, the fastening member includes a bolt and a nut. Either the bolt or the nut is secured to either the containing box body or the front cover which does not have the through hole.

In this configuration, the fastening member includes the bolt and the nut, and therefore the containing box body and the front cover can be positively firmly fastened together with this simple construction.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Embodiments according to the present invention will now be described in detail with reference to the accompanying drawings.

Figure 1:
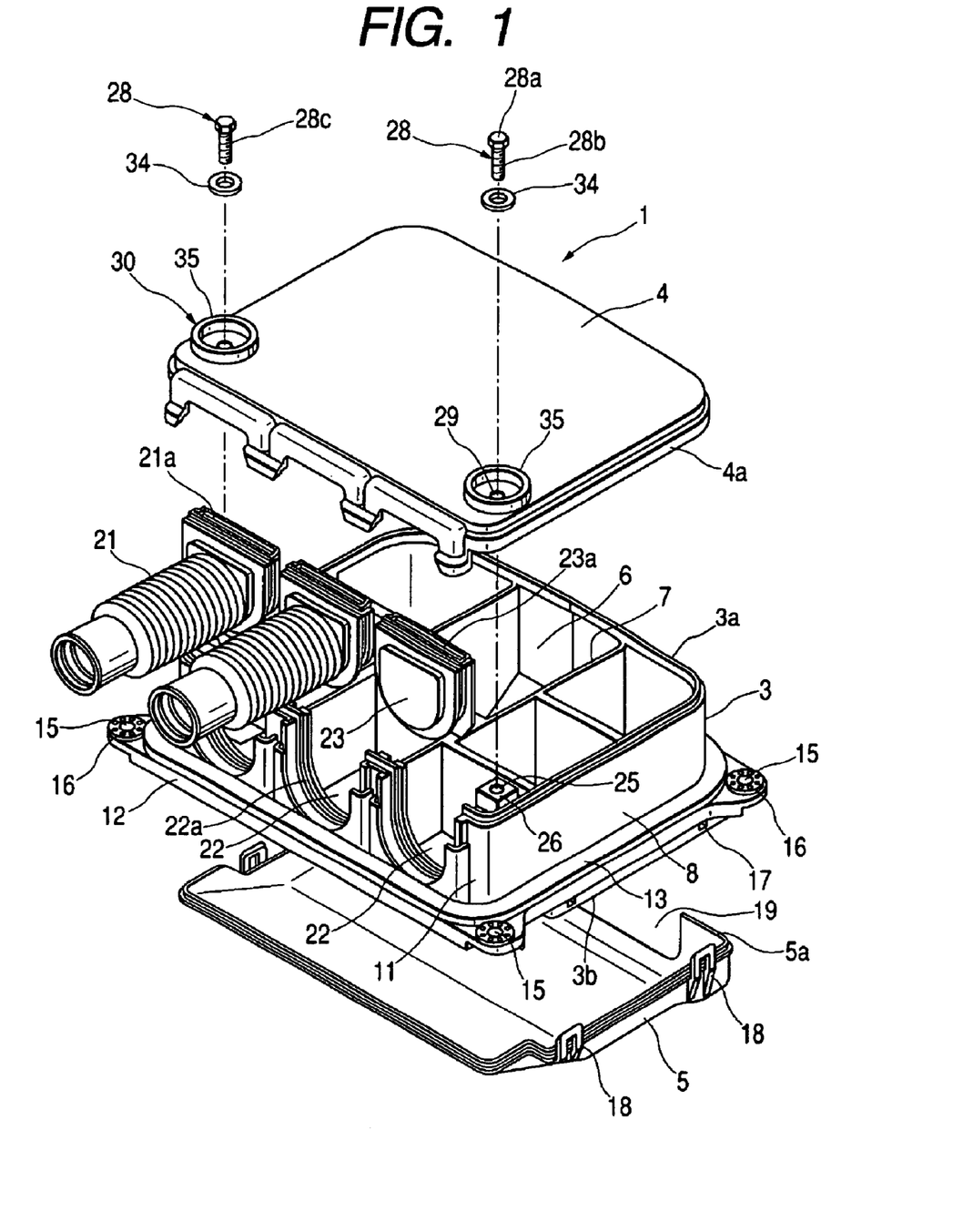
FIG. 1 is an exploded, perspective view showing a first embodiment of a waterproof structure of an electronic parts-containing box of the invention.
Figure 2:
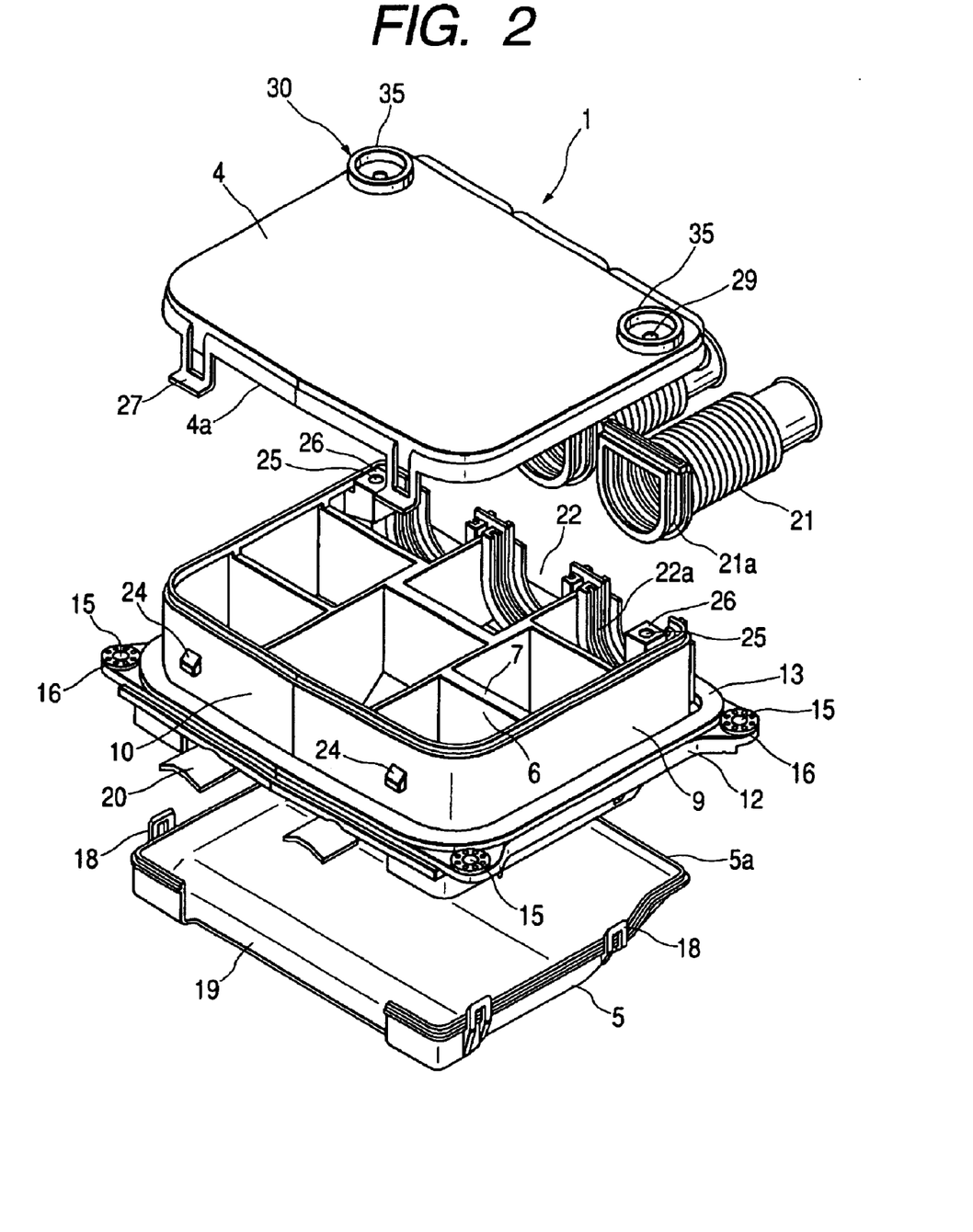
FIG. 2 is an exploded, perspective view showing the electronic parts-containing box of FIG. 1 from the opposite direction.
Figure 3:
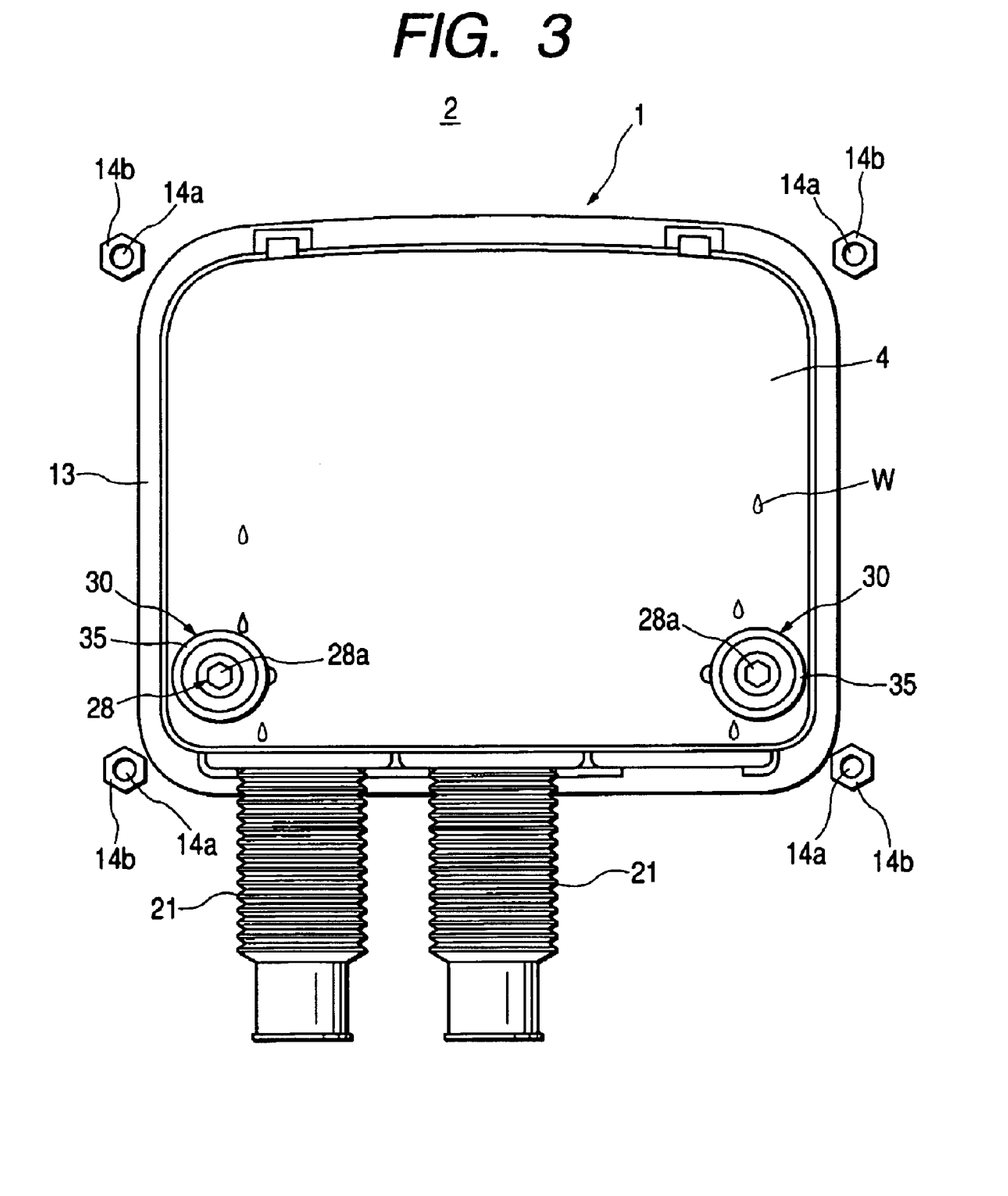
FIG. 3 is a front-elevational view of a front cover of the electric parts-containing box of FIG. 1, showing a condition in which water flows over a face of this front cover.
Figure 4:
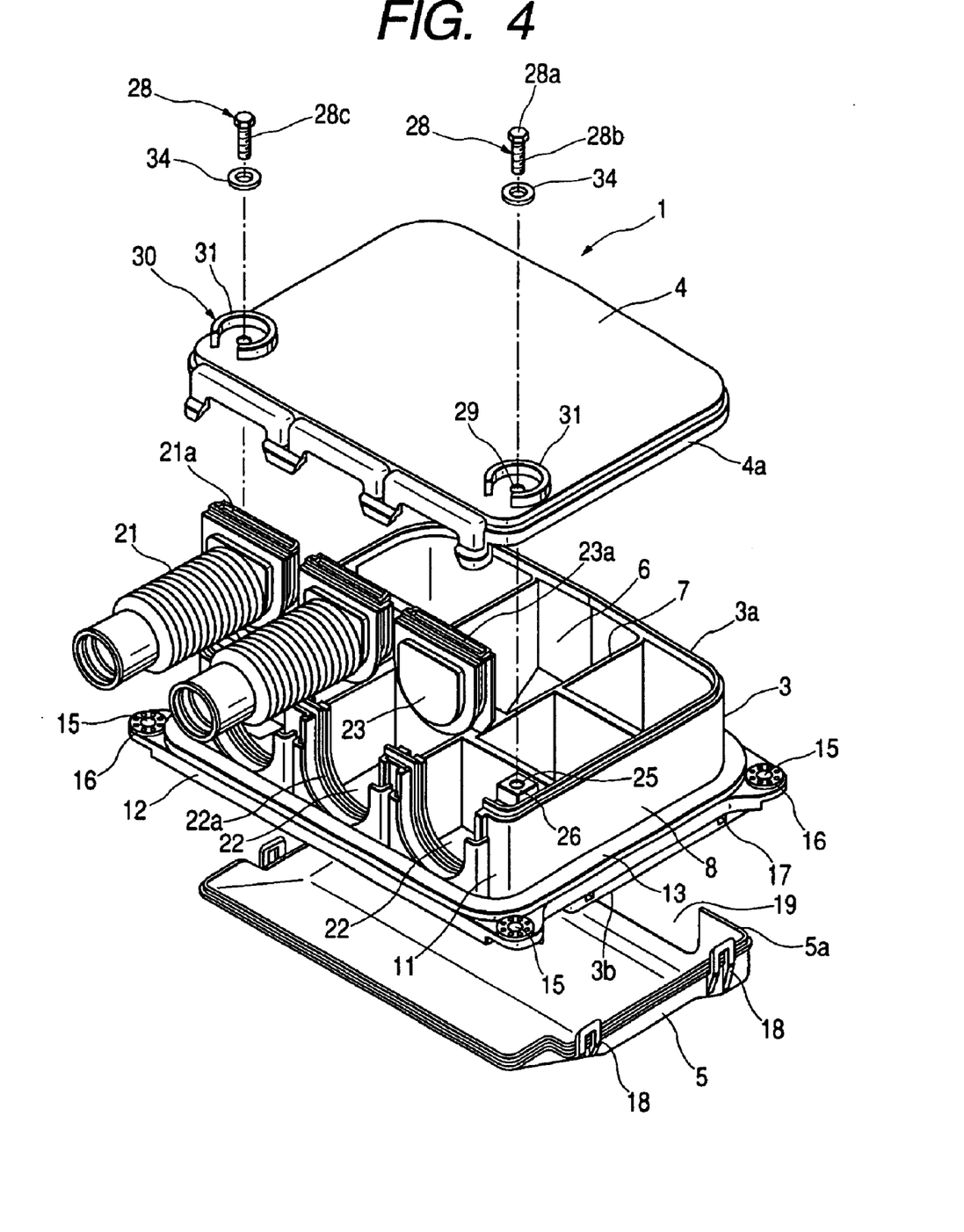
FIG. 4 is an exploded, perspective view showing a modification of the first embodiment of the waterproof structure of the electronic parts-containing box of the invention.
Figure 5:
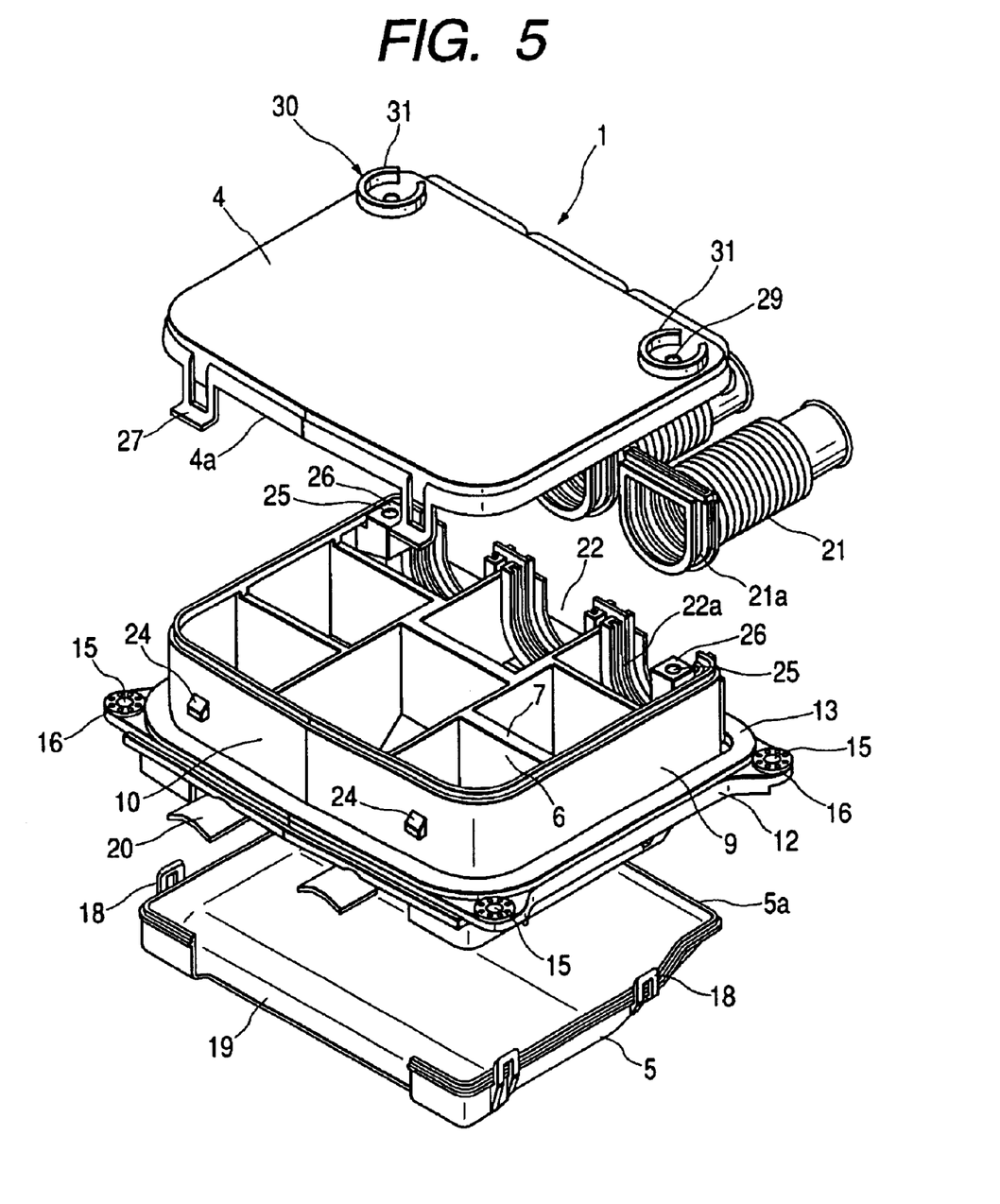
FIG. 5 is an exploded, perspective view showing the electronic parts-containing box of FIG. 4 from the opposite direction.
Figure 6:
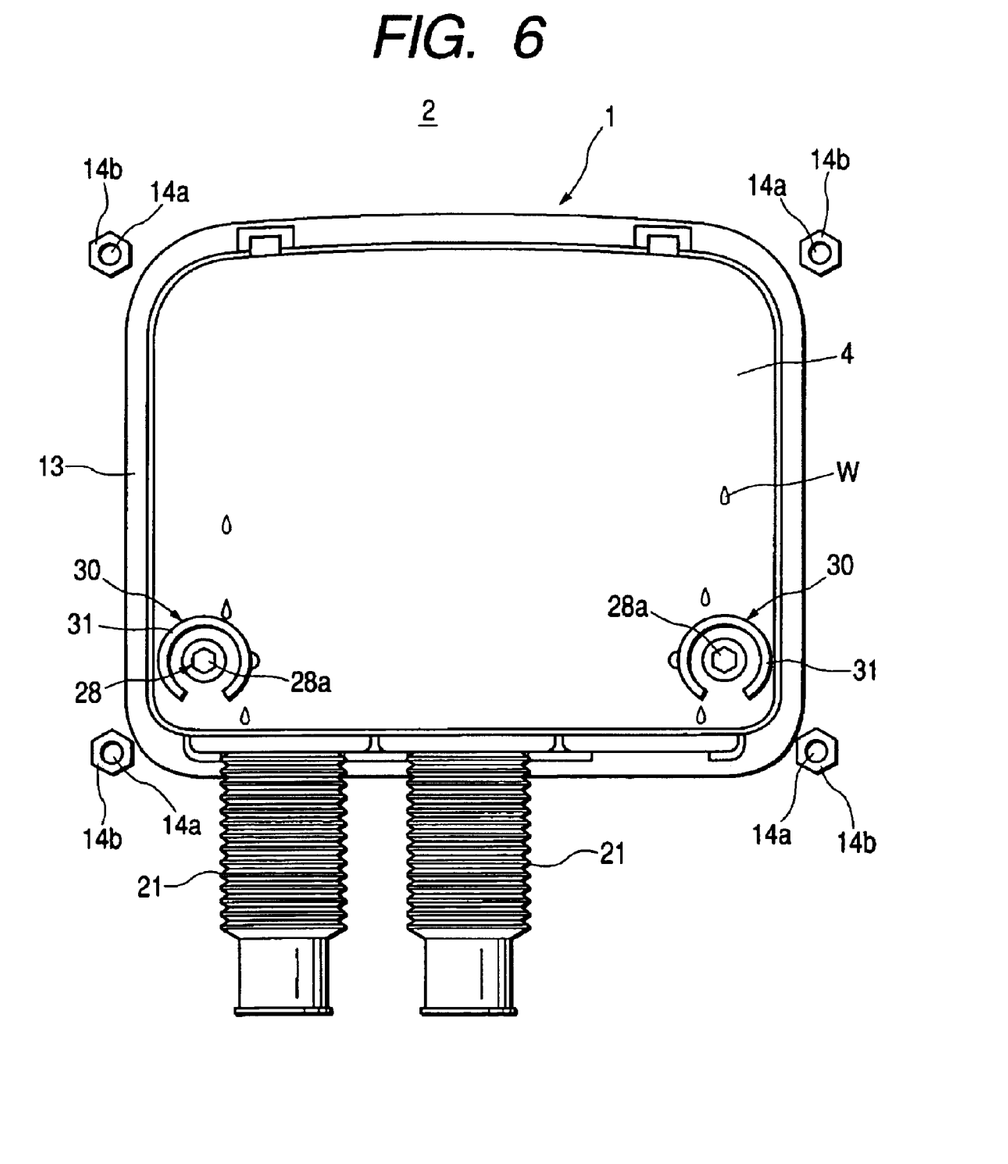
FIG. 6 is a front-elevational view of a front cover of the electric parts-containing box of FIG. 4, showing a condition in which water flows over a face of this front cover.
Figure 7:
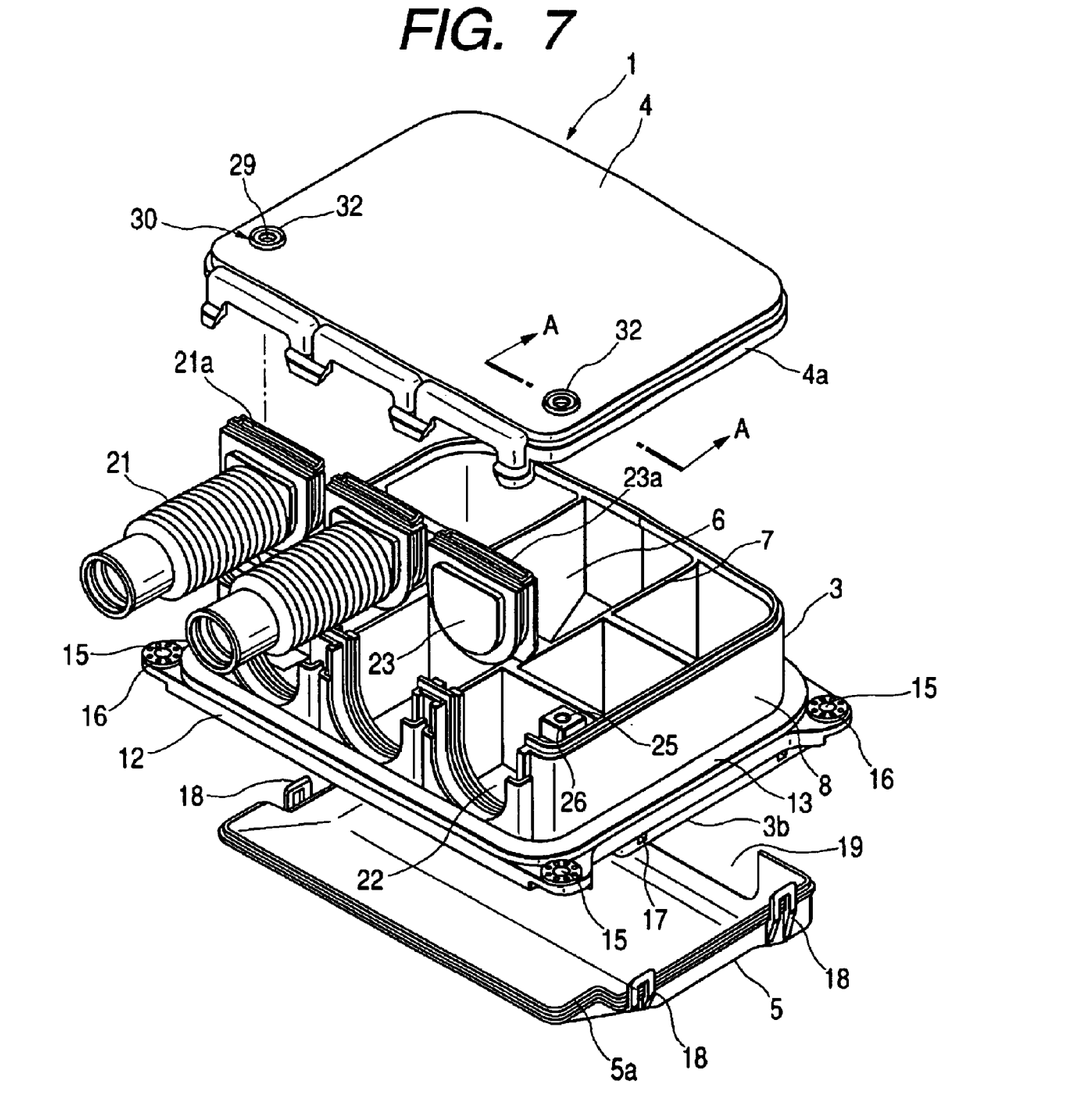
FIG. 7 is an exploded, perspective view showing a second embodiment of a waterproof structure of an electronic parts-containing box of the invention.
Figure 8:
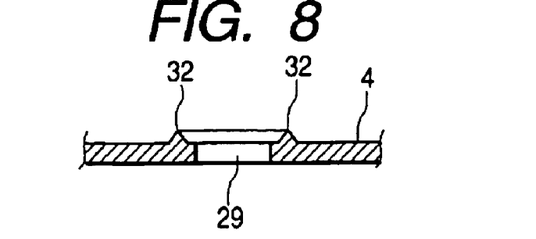
FIG. 8 is a cross-sectional view taken along the line A-A of FIG. 7.

FIGS. 1 to 3 are views showing a first embodiment of a waterproof structure of an electronic parts-containing box of the invention, FIGS. 4 to 6 are views showing a modification of the first embodiment of the waterproof structure of the electronic parts-containing box of the invention, and FIGS. 7 and 8 are views showing a second embodiment of a waterproof structure of an electronic parts-containing box of the invention.

In FIGS. 1 to 8, examples of this electronic parts-containing box 1 include an electric connection box (mounted on a vehicle or the like), such as a junction box, a fuse box and a relay box, containing electrical parts (such as fuses, relays and an electronic control unit), and a connector block which is mounted in a panel hole in a vehicle body panel of the vehicle or the like, and serve to connect connectors of wire harnesses together. In the first embodiment, description will be made of the connector block.

The electronic parts-containing box (connector block) 1 is mounted in a panel hole (not shown) in a vehicle body panel 2 separating the inside and outside of a car room of a vehicle from each other. For example, the electronic parts-containing box (connector block) 1 is made of a synthetic resin, and is formed into a box-like shape of a generally rectangular cross-section, and this box comprises a containing box body (block body) 3, a front cover 4, and a reverse cover 5.

The containing box body 3 is formed into a box-like shape (rectangular tubular shape) in which two opposed sides of a larger area are open, and the front cover 4 is attached to one of these open portions while the reverse cover 5 is attached to the other. For example, the interior of the containing box body 3 is divided by partition walls 7 into connector receiving chambers 6 and so on, and connectors, connected respectively to inside wire harnesses (not shown) installed at the inside of the car room, and connectors, connected respectively to outside wire harnesses (not shown) installed at the outside of the car room, are received within these connector receiving chambers 6 so that the inside connectors can be fitted relative to the outside connectors, respectively, to be electrically connected thereto.

The containing box body 3 has such a size that its four side walls 8, 9, 10 and 11 can pass through the panel hole in the vehicle body panel 2 in an axial direction (first direction) parallel to these four side walls 8, 9, 10 and 11, and the containing box body 3 is slightly smaller in size than the panel hole. A flange 12 is formed on and projects outwardly from the four side walls 8, 9, 10 and 11 over the entire periphery of the containing box body, the flange 12 being disposed in a plane perpendicular to the first direction, and the flange 12 lying between a plane, disposed centrally of the height of the four side walls 8, 9, 10 and 11 and that end of the containing box body to which the reverse cover 5 is attached. The flange 12 is larger in size than the panel hole in the vehicle body panel 2, and is adapted to be held against the face of the vehicle body panel 2 having the panel hole (that is, held against that portion of the vehicle body panel 2 around the panel hole).

A packing 13 for contact with the face of that portion of the vehicle body panel 2 around the panel hole is provided on that side or face of the flange 12, directed toward the front cover 4, over an entire periphery thereof. Bolt holes 15 are formed respectively through four corner portions of the flange 12, and the containing box body 3 is secured to the vehicle body panel 2 by bolts 14a and nuts 14b through these bolt holes 15. Reinforcing members 16 are provided at these four corner portions, respectively, and serve to prevent the bolt holes 15 from being deformed upon tightening of the bolts 14a, and also serve to provide good contact of the flange with other member.

The ends (3b) of the four side walls 8, 9, 10 and 11, to which the reverse cover 5 is attached, are so formed as to fit in a peripheral edge portion 5a of the reverse cover 5. For example, engagement projections 17 are formed on the outer faces of the two opposed side walls (first and second side walls) 8 and 9, and the engagement projections 17 on each of the two side walls 8 and 9 are disposed between the flange 12 and the end (3b) to which the reverse cover 5 is attached.

The reverse cover 5 closes the other open portion of the containing box body 3, and has, for example, a rectangular flat plate-like configuration. The peripheral edge portion 5a of the reverse cover 5 is bent substantially at right angles, and can be fitted on the ends (3b) of the four side walls 8, 9, 10 and 11. Engagement frame-like portions 18 for being engaged respectively with the engagement projections 17, formed on the first and second side walls 8 and 9, are formed on those portions of the peripheral edge portions 5a of the reverse cover 5 corresponding respectively to the first and second side walls 8 and 9. The reverse cover 5 can be attached to the containing box body 3 by engaging the engagement frame-like portions 18 respectively with the engagement projections 17.

An insertion portion 19 for passing, for example, the inside wire harnesses therethrough is formed in that portion of the peripheral edge portion 5a of the reverse cover 5 corresponding to one (here, the third side wall 10) of the remaining opposed side walls 10 and 11 of the containing box body 3. Since that portion of the containing box body 3, extending from the flange 12 to the end thereof to which the reverse cover 5 is attached, is disposed within the car room, it is not necessary to provide any waterproof means on this portion, and therefore the reverse cover 5 may be attached to the containing box body 3 by the engagement (resin locking) of the engagement frame-like portions 18 with the engagement projections 17.

In FIGS. 2 and 5, reference numeral 20 denotes guide members for guiding the inside wire harnesses.

One or a plurality of (three in the illustrated embodiment) mounting portions 22 (each in the form of a U-shaped notch), in which grommets 21 (mounted respectively on the outside wire harnesses) and so on can be fitted, respectively, are formed in that portion of the remaining side wall (fourth side wall) 14 of the containing box body 3, lying between the flange 12 and the end thereof to which the front cover 4 is attached. The grommet 21 and a closure members 23, made of an elastic material such as rubber, are fitted in the mounting portions 22, respectively, and the mounting portions 22 may have any shape in so far as the grommets 21 and the closure member 23 can be fitted therein. Preferably, an edge portions 22a of each mounting portion 22, an edge portion 21a of each grommet 21 and an edge portion 23a of the closure member 23 are so shaped that when the grommets 21 and the closure member 23 are fitted respectively in the mounting portions 22, water will not intrude into the containing box body 3 through a gap between the mating edge portions.

Engagement projections 24 are formed on that portion of the outer face of the third side wall 10 disposed close to that end thereof to which the front cover 4 is attached, and these projections 24 are provided at opposite end portions of the third side wall 10 disposed adjacent respectively to the first and second side walls 8 and 9.

Fastening portions 26, each having a screw hole 25 having a thread groove formed in an inner face thereof, are provided within the containing box body 3, and are formed respectively at two corners thereof disposed adjacent respectively to the opposite ends of the fourth side wall 11, the fastening portions 26 extending in an upstanding manner in the first direction. The fastening portions 26 may take any form in so far as the screw hole 25, formed in each fastening portion 26, extends in the first direction. For example, the fastening portions 26 have a rectangular cross-section. Each fastening portion 26 has such a length that when the front cover 4 is attached to the containing box body, a distal end of the fastening portion 26, to which the screw hole 25 is open, is disposed in close proximity to the reverse face of the front cover 4. Although the thread groove of the screw hole 25 may be formed in the inner face defining the screw hole 25, it is preferred that the thread groove be provided by a thread groove of a nut embedded or molded in the fastening portion.

The front cover 4 closes the one open portion of the containing box body 3, and has, for example, a rectangular flat plate-like configuration. A peripheral edge portion 4a of the front cover 4 can be fitted on the ends (3a) of the four side walls 8, 9, 10 and 11 defining the one open end. That portion of the peripheral edge portion 4a, corresponding to the fourth side wall 11, is so shaped as to be fitted on and pressed against the grommets 21 and the closure member 23, fitted respectively in the mounting portions 22, so that water will not intrude into the containing box body through a gap therebetween. A packing (not shown) is provided at the one end of the containing box body 3 (for fitting in the peripheral edge portion 4a of the front cover 4) and those portions of the containing box body 3 for contact with the grommets 21 and the closure member 23, and when the front cover 4 is attached to the containing box body 3, this packing forms a seal between the front cover 4 and the containing box body 3, and also forms a seal between the front cover 4 and each of the grommets 21 and closure member 23.

Engagement frame-like portions 27 for being engaged respectively with the engagement projections 24, formed on the third side wall 10, are formed on that portion of the peripheral edge portions 4a of the front cover 4 corresponding to the third side wall 10.

Through holes 29 and 29 are formed respectively through two of four corner portions of the front cover 4 remote from the engagement frame-like portions 27. When the front cover 4 is attached to the containing box body 3, these through holes 29 and 29 are aligned with the screw holes 25, respectively. Each through hole 29 has a round shape, and preferably the through hole 29 is formed into such a minimum diameter as to allow a thread portion 28b (having a thread groove formed therein) of a bolt 28 (a constituent element of a fastening member) to pass therethrough, and for example the diameter of the through hole 29 is slightly larger than the diameter of the thread portion 28b.

The fastening members may take any form in so far as they can fasten the front cover 4 and the containing box body 3 together, and for example the fastening member may be formed by the screw hole 25 (having the thread groove) and a screw member (such as the bolt 28 or a screw) threaded into this screw hole 25. Preferably, each fastening member comprises the bolt 28 and a nut (not shown) both of which are made of metal, and the nut may be embedded in the fastening portion 26 to provide the screw hole 25, and the front cover 4 is fastened to the containing box body 3 by threading the bolts 28 into the respective screw holes 25, as shown in the drawings. In contrast, the bolts may be embedded in the fastening portions 26, respectively, and when the front cover 4 is fitted on the containing box body 3, the thread portions of the bolts project from the through holes 29, respectively, and the front cover 4 is fastened to the containing box body 3 by threading the nuts on these thread portions, respectively.

The bolt 28 includes a head 28a, so shaped and sized as not to be inserted into the through hole 29, and the thread portion 28b which can be inserted into the through hole 29 to be threaded in the screw hole 25. Preferably, the head 28a has such size and shape that it can abut in an annular manner against the face of the front cover 4 (having the through hole 29) in surrounding relation to the through hole 29, and the head 28a for abutting against the face of the front cover 4 serves as an abutment portion 28c.

Water intrusion-suppressing portions 30 each for suppressing the intrusion of water W (such as rain water) into the through hole 29 are formed on the front cover 4. Each water intrusion-suppressing portion 30 may take any form in so far as it can suppress the intrusion of water W into the through hole 29. More specifically, one example of the water intrusion-suppressing portion 30 is a guide wall 35, 31 integrally formed in an upstanding manner on the front cover 4 in spaced relation to an abutment region of the front cover 4 (against which the abutment portion 28c (the head 28a) of the bolt 28 can be abutted) and preferably adjacent to this abutment region, as shown in FIGS. 1 to 6. As shown in FIGS. 3 and 6, the guide wall 35, 31 serves to guide water W, flowing in a direction toward the through hole 29, in a different direction. The guide wall may be provided only in a flow passage through which water W, deposited on the face of the front cover 4, flows over this face toward the through hole 29, or the guide wall of a circular shape may be provided around the through hole 29 as shown in FIGS. 1 to 3. In the configuration, the water is prevented from intruding into the containing box body through a gap in the through hole when the front cover is inclined in any direction. In other case where the front cover 4 is arranged generally parallel to a vertical plane, the guide wall of an arcuate shape, having an opening disposed below the through hole 29, may be provided around the through hole 29 as shown in FIGS. 4 to 6.

As shown in FIGS. 3 and 6, the guide wall 35, 31 has such a suitable height that water W, flowing toward the through hole 29, will not flow over the guide wall 35, 31 into the through hole 29. The thickness of the guide wall is not particularly limited, but it is preferred that the guide wall should have such a thickness that it will not be easily crushed when other member or the like impinges on it.

The shape of the guide wall 35, 31 is not particularly limited, and in the illustrated embodiments, the guide wall has a circular shape or an arcuate shape. However, the guide wall is not limited to such shapes, but may have any other suitable shape such for example as an oval shape, a rectangular shape, a triangular shape, a bent shape and a curved shape.

A further example of the water intrusion-suppressing portion 30 is a ring-like rib 32 which is integrally formed in an upstanding manner on the annular abutment region of the front cover 4 against which the abutment portion 28c (the head 28a) of the bolt 28 can be abutted (or against which the nut can be abutted in the case where the bolt is embedded in the fastening portion 26, or against which a washer 34 can be abutted in the case where the washer 34 is used), as shown in FIGS. 7 and 8. When the bolt 28 is threaded into the screw hole 25, and is tightened, the rib 32 is crushed by the head 28a of the bolt 28 to seal a gap between the front cover and the head 28a of the bolt 28. The shape of the rib 32 is not particularly limited, and for example the rib has a triangular cross-section, a semi-circular cross-section or a rectangular cross-section. The thickness and height of the rib 32 are not particularly limited in so far as the rib can be crushed by the head 28a of the bolt 28 to seal the gap between the front cover and the head 28a of the bolt 28.

For mounting this electronic parts-containing box 1 on the vehicle body panel 2, first, the end 3a of the containing box body 3, defining the one open portion, is inserted into the panel hole in the vehicle body panel 2 from the inside of the car room, and the flange 12 is held against the vehicle body panel 2 through the packing 13. As a result, the bolt holes 15, formed respectively through the four corner portions of the flange 12, are aligned respectively with bolt insertion holes (not shown) formed through that portion of the vehicle body panel 2 disposed adjacent to the panel hole. Each bolt 14a is passed sequentially through the corresponding bolt hole 15 and bolt insertion hole, and the nut 14b is threaded on that portion of the bolt 14a, projecting from the bolt insertion hole, and the bolts 14a are tightened relative to the nuts 14b, respectively, thereby mounting the containing box body 3 on the vehicle body panel 2 through the flange 12. At this time, the packing 13 is interposed between the containing box body 3 and the vehicle body panel 2, and this packing is sufficiently compressed (pressed to be deformed) by tightening the bolts relative to the respective nuts, thereby forming a seal between the containing box body 3 and the vehicle body panel 2, so that water will not intrude into the car room through the gap between the two.

The connectors, connected respectively to the inside wire harnesses, are inserted respectively into the connector receiving chambers 6 through the other open portion of the containing box body 3, and the peripheral edge portion 5a of the reverse cover 5 is fitted on the ends (the end 3b of the containing box body 3) of the side walls 8, 9, 10 and 11 defining this open portion, and at the same time the engagement frame-like portions 18 of the reverse cover 5 are engaged respectively with the engagement projections 17 on the containing box body 3, thereby attaching the reverse cover 5 to the containing box body 3.

The grommets 21, fixed respectively to the outside wire harnesses, are fitted and mounted respectively in the mounting portions 22 of the containing box body 3, while the closure member 23 is fitted and mounted in the remaining mounting portion 22 in which the grommet 21 is not fitted. The connectors, connected respectively to the wire harnesses each having the grommet 21 fitted thereon, are inserted into the connector receiving chambers 6, respectively, and these connectors are fitted relative to the connectors of the inside wire harnesses, respectively, to be electrically connected thereto.

The peripheral edge portion 4a of the front cover 4 is fitted on the end 3a (the ends of the side walls 8, 9, 10 and 11) of the containing box body 3, and at the same time the engagement frame-like portions 27 of the front cover 4 are engaged respectively with the engagement projections 24 on the third side wall 10, thus fitting the front cover 4 on the one open portion of the containing box body 3. As a result, the through holes 29, formed through the front cover 4, are substantially aligned respectively with the screw holes 25 formed respectively in the fastening portions 26 provided within the containing box body 3. The distal end portion of the thread portion 28b of each metal bolt 28 is inserted into the corresponding through hole 29 through the washer 34, and when this distal end portion is brought into contact with the fastening portion 26, the bolt 28 is turned to be threaded into the screw hole 25. As a result, the front cover 4 is firmly fastened to the containing box body 3 by the bolts 28 threaded respectively into the screw hole 25. Namely, the peripheral edge portion 4a of the front cover 4 is pressed against the one end 3a (the ends of the side walls 8, 9, 10 and 11) of the containing box body 3. The packing is provided at the peripheral edge portion 4a of the front cover 4 thus pressed against the one end 3a of the containing box body 3, and therefore this packing is sufficiently compressed (pressed to be deformed) by tightening the bolts 28, thereby forming a seal between the front cover 4 and the containing box body 3, so that water will not intrude into the containing box body through the gap between the two.

In the case where each fastening member comprises the metal bolt 28 and the metal nut, and the metal nut is embedded in the fastening portion to provide the screw hole 25, the front cover 4 can be positively firmly fastened to the containing box body 3 with the simple construction. Namely, in the case where the screw hole 25, having the thread groove, is formed directly in the fastening portion, made of a synthetic resin, without the use of such a nut, there is a possibility that the thread groove of the screw hole is broken when the screw member, such as the bolt 28 or a screw, is tightened hard.

Although the front cover 4 is attached after the reverse cover 5 is attached, the reverse cover 5 may be attached after attaching the front cover 4, or the front and reverse covers 4 and 5 may be attached at the same time.

When the electronic parts-containing box 1 is thus mounted on the vehicle body panel 2 separating the inside and outside of the car room from each other, the front cover 4 is disposed at the outside of the car room, and therefore water, such as rain water, may deposit on the outer face of the front cover 4. The front cover 4 has the plate-like configuration, and therefore the outer face of the front cover 4 is seldom arranged generally parallel to a horizontal plane, but is inclined or disposed generally parallel to a vertical plane as shown in FIGS. 3 and 6. Therefore, water, deposited on the outer face of the front cover 4, flows downwardly in the direction of the gravity over the outer face. During the running of the vehicle, the water tends to flow downwardly in the direction of the gravity though not downwardly in the vertical direction.

Some (designated at W) of this flowing water flows toward the through holes 29. The water W (such as rain water), flowing toward each through hole 29, is prevented by the water intrusion-suppressing portion 30, formed on the outer face of the front cover 4, from intruding into the through hole 29.

More specifically, as shown in FIGS. 3 and 6, the water W flows in a direction toward the through hole 29, and when the water W reaches the vicinity of the through hole 29, the water W is guided in a different direction by the guide wall 35, 31 serving as the water intrusion-suppressing portion 30, and therefore will not flow to the through hole 29 (and hence to the head 28a of the bolt 28). Therefore, the water W is prevented from intruding into the gap between the bolt 28 and the through hole 29, so that the intrusion of the water W into the electronic parts-containing box 1 is prevented. Thus, by forming the guide walls 35, 31 of the simple construction integrally on the outer face of the front cover 4, the intrusion of the water W into the electronic parts-containing box 1 can be suppressed without the use of other member.

In the case where the ring-like rib 32 is formed on each annular abutment region of the front cover 4, against which the abutment portion 28c (the head 28a) of the bolt 28 can be abutted (or against which the washer 34 can be abutted when the washer 34 is used) over the entire periphery thereof as shown in FIGS. 7 and 8, also, the intrusion of the water W into the electronic parts-containing box 1 can be suppressed.

Namely, the bolt 28 is inserted into the through hole 29, and is threaded into the screw hole 25, and is tightened, the rib 32 is crushed by the abutment portion 28c (the head 28a) (or by the washer 34 when the washer 34 is used) to seal the gap between the front cover and the head 28a of the bolt 28. Thus, the gap between the face of the front cover 4 and the head 28a of the bolt 28 is closed by the crushed rib 32, and therefore even when water, deposited on the front cover 4, flows over the outer face thereof to reach the head 28a of the bolt 28, the water will not intrude into the through hole 29.

Therefore, the intrusion of the water W into the electronic parts-containing box 1 can be suppressed. Thus, by forming the ribs 32 of the simple construction integrally on the outer face of the front cover 4, the intrusion of the water W into the electronic parts-containing box 1 can be suppressed without the use of other member.

The guide walls 35, 31, as well as the ribs 32, may be formed integrally on the outer face of the front cover 4, and with this construction the intrusion of the water W into the gap between each through hole 29 and the bolt 28 can be more positively suppressed, and therefore the intrusion of the water W into the electronic parts-containing box 1 can be more positively suppressed.

In the case where the electronic parts-containing box 1 is the connector block, and the mounting portions 22 are provided only at one side wall (for example, the fourth side wall 11) of the containing box body 3, water is liable to intrude into the containing box body 3 through the gap between the fourth side wall 11 (having the mounting portions 22 in which the grommets 21 and the closure member 23 are mounted, respectively) and the peripheral edge portion of the front cover 4 and also through its neighboring regions, and therefore this portion is fastened by the fastening members (the bolts 28), and by doing so, the water is prevented from intruding through the gap between the peripheral edge 3a of the containing box body 3 and the peripheral edge portion 4a of the front cover 4.

Namely, the grommets 21 and the closure member 23 are molded of an elastic material, and therefore unless the force of pressing of the front cover 4 against the grommets 21 and the closure member 23 is large, water may intrude through the gap therebetween and its neighboring portions. Therefore, this portion is fastened by the fastening members (the bolts 28), and by doing so, the intrusion of the water through the gap between the peripheral edge 3a of the containing box body 3 and the peripheral edge portion 4a of the front cover 4 can be prevented. The engagement frame-like portions 27 of the front cover 4 are engaged respectively with the engagement projections 24 on the third side wall 10, and the front cover 4 is fitted on the one open portion of the containing box body 3, and then the bolts 28 are inserted respectively into the two through holes 29 (provided adjacent to the edge portion of the front cover opposed to the edge portion thereof having the engagement frame-like portions 27 formed thereon), and are threaded into the screw holes 25, respectively, thereby fastening the front cover 4 to the containing box body 3, and with this construction it is necessary to provide only the two through holes 29, into which the bolts 28 are inserted, respectively, and the intrusion of water into the containing box body 3 can be more positively suppressed.

Figure 9:
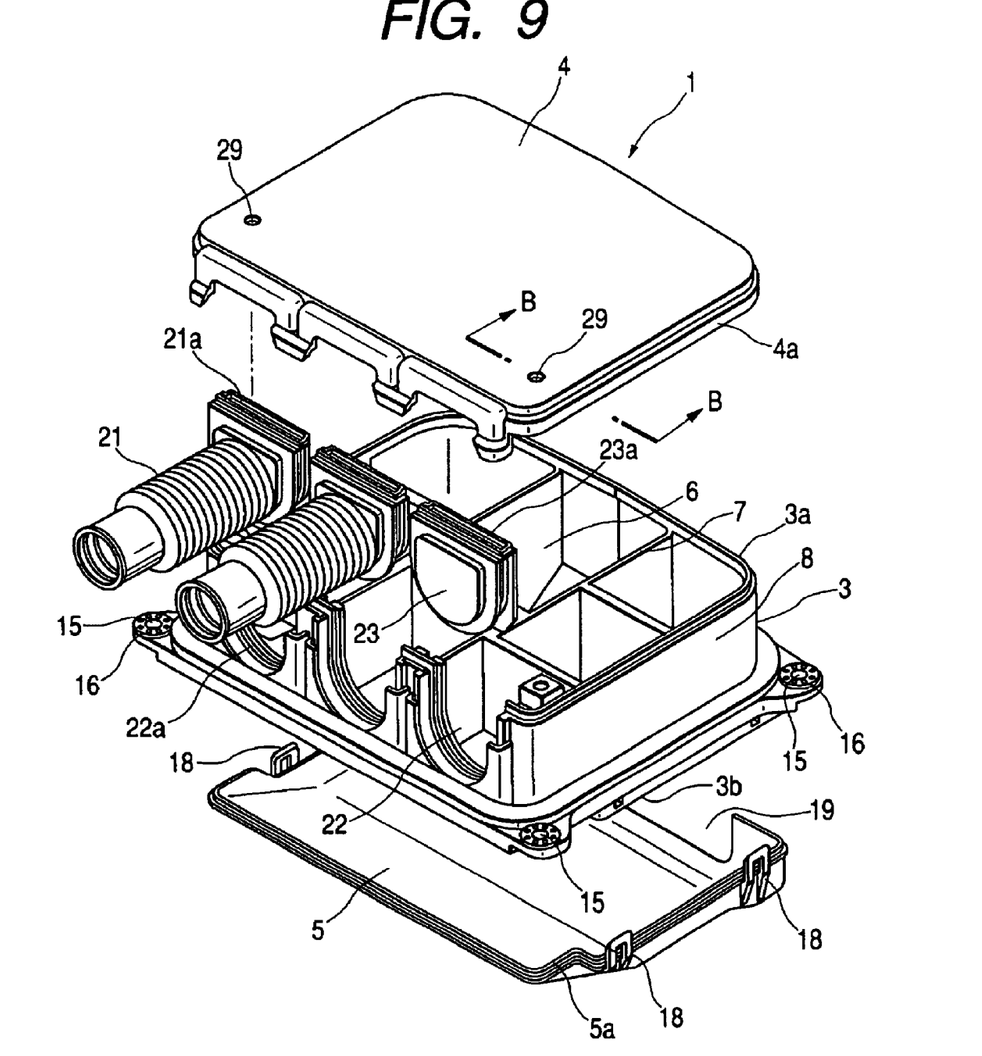
FIG. 9 is an exploded, perspective view showing a third embodiment of a waterproof structure of an electronic parts-containing box of the invention.
Figure 10:
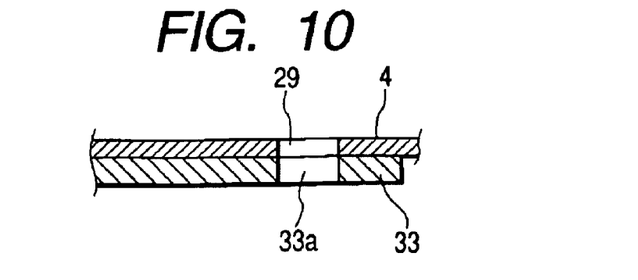
FIG. 10 is a cross-sectional view taken along the line B-b of FIG. 9.

As shown in FIGS. 9 and 10, packings 33 may be provided respectively on those portions of a reverse face of a front cover 4 in which through holes 29 are formed. Each packing 33 has an insertion hole 33a which has substantially the same shape (for example, a circular shape) as that of the through hole 29, and preferably the packings 33 are bonded to the reverse face of the front cover 4 by an adhesive or the like in such a manner that their insertion holes 33a are aligned with the through holes 29, respectively. Preferably, the size of each packing 33 is generally equal to or larger than the size of the distal end of the fastening portion 26 to which the screw hole 25 is open. Although the packings 33 are provided on the reverse face of the front cover 4, the packings 33 may be provided on the fastening portions 26, respectively.

Each packing 33 serves to form a seal between the reverse face of the front cover 4 and the fastening portion 26. If the thickness of the packing 33 is too large, the peripheral packing, provided between the one end 3a of the containing box body 3 and the peripheral edge 4a of the front cover 4 will not be sufficiently compressed (pressed to be deformed) when attaching the front cover 4, for example, by threading the bolts 28, and as a result water may intrude through the gap therebetween, and therefore the thickness of the packing 33 is so determined that the peripheral packing can be sufficiently compressed (pressed to be deformed).

Namely, preferably, each packing 33 has such a thickness that the peripheral packing between the peripheral edge portion 4a of the front cover 4 and the one end 3a of the containing box body 3 can be sufficiently compressed when attaching the front cover 4 and that the packing 33 can be sufficiently compressed between the reverse face of the front cover 4 and the fastening portion 26. It is most preferred that each packing 33 is molded into such a thickness, but the packing 33 is provided at the region near to the bolt 28, and effects of the tightening of the bolt 28 are directly exerted on this region, and therefore, in some cases, the packing 33 can not be molded into the above thickness.

Therefore, preferably, the thickness of the packing 33 is the largest within the thickness range enabling the sufficient compression of the peripheral packing between the one end 3a of the containing box body 3 and the peripheral edge portion 4a of the front cover 4.

Each packing 33, thus provided between the reverse face of the front cover 4 and the fastening portion 26, may not be sufficiently compressed, but has a sealing effect, and therefore even when water intrudes into the gap between the bolt 28 and the through hole 29, this water is prevented from passing through this gap.

Therefore, by providing the water intrusion-suppressing portions 30 on the front cover and also by providing each packing 33 between the reverse face of the front cover 4 and the fastening portion 26, the intrusion of water into the containing box body 3 can be more positively prevented.

In the embodiments of the present invention, for attaching the front cover 4 to the containing box body 3, the engagement frame-like portions 27 of the front cover 4 are engaged respectively with the engagement projections 24 on the third side wall 10, and the front cover 4 is fitted on the one open portion of the containing box body 3, and then the bolts 28 are inserted respectively into the two through holes 29 (provided adjacent to the edge portion of the front cover opposed to the edge portion thereof having the engagement frame-like portions 27 formed thereon), and are threaded into the screw holes 25, respectively, thereby fastening the front cover 4 to the containing box body 3. However, four through holes may be formed through the four corner portions of the front cover 4, respectively, in which case the bolts are inserted respectively into the four through holes, and are threaded into the containing box body 3. By thus tightening the bolts at the four portions, a more positive seal can be formed between the edge 3a of the containing box body 3 and the peripheral edge portion 4a of the front cover 4.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A waterproof structure of an electric parts-containing box, comprising:
    a containing box body; and
    a front cover, mounted on the containing box body so as to cover a opening portion thereof;
    wherein either the containing box body or the front cover has a through hole,
    wherein a water intrusion suppressing portion is formed on a face of either the containing box body or the front cover so as to suppress an intrusion of water which flows on the face into the through hole,
    wherein the water intrusion suppressing portion is a guide wall which is formed on the face of either the containing box body or the front cover, and is disposed near to the through hole, so as to guide the water in a direction which is different from a direction in which the water flows toward the through hole, and
    wherein the guide wall is a peripheral wall in which a portion of the peripheral wall is open in a direction of gravity when the face of either the containing box body or the front cover is inclined.

2. The waterproof structure as set forth in claim 1, wherein the peripheral wall is substantially arcuate-shaped.

3. A waterproof structure of an electric parts-containing box, comprising:
    a containing box body; and
    a front cover, mounted on the containing box body so as to cover a opening portion thereof;
    wherein either the containing box body or the front cover has a through hole, such that an entrance of the through hole is disposed on a face of either the containing box body or the front cover; and
    wherein a water intrusion suppressing portion is formed on the face of either the containing box body or the front cover so as to extend above the entrance to the through hole to suppress an intrusion of water which flows on the face into the through hole, and
    further comprising a fastening member, which threads through the through hole to fasten the front cover and the containing box body;
        wherein the water intrusion suppressing portion is a rib which formed around at least a part of a circumference of the through hole; and
        wherein the rib is crushed by an abutment face of the fastening member so as to seal a gap between the face and the abutment face of the fastening member when the containing box body and the front cover are fastened together by the fastening member.

4. The waterproof structure as set forth in claim 3, wherein the fastening member includes a bolt and a nut, and
    wherein either the bolt or the nut is secured to either the containing box body or the front cover which does not have the through hole.

5. The waterproof structure as set forth in claim 3, wherein a cross-section of the rib is substantially triangular.

6. A waterproof structure of an electric box, comprising:
    a containing box body;
    a front cover, mounted on the containing box body, so as to cover an opening portion thereof;
    a through hole formed through the front cover; and
    a water intrusion suppressing portion formed around the through hole,
    wherein a portion of the face of the front cover is exposed between an outer circumference of the through hole and the water intrusion suppressing portion, such that there is a gap between the through hole and the water intrusion suppressing portion.

* * * * *